US008467505B2

(12) United States Patent
Howell et al.

(10) Patent No.: US 8,467,505 B2
(45) Date of Patent: Jun. 18, 2013

(54) VOICEMAIL FILTERING SOFTWARE

(76) Inventors: David A Howell, Seattle, WA (US);
Linda Criddle, Kirkland, WA (US);
David Milstein, Redmond, WA (US);
Lon-Chan Chu, Redmond, WA (US);
Michael D Malueg, Renton, WA (US)

(*) Notice: Subject to any disclaimer, the term of this patent is extended or adjusted under 35 U.S.C. 154(b) by 1472 days.

(21) Appl. No.: 11/444,798

(22) Filed: May 31, 2006

(65) Prior Publication Data

US 2007/0280205 A1  Dec. 6, 2007

(51) Int. Cl.
*H04M 11/00* (2006.01)
*H04J 1/02* (2006.01)
*H04L 12/56* (2006.01)
*G06F 15/177* (2006.01)
*G06F 15/16* (2006.01)
*G06F 9/44* (2006.01)
*G06F 15/18* (2006.01)
*H04Q 7/38* (2006.01)

(52) U.S. Cl.
USPC ........ 379/88.13; 370/493; 370/495; 709/203; 709/206; 709/219; 455/414.1; 379/88.11

(58) Field of Classification Search
USPC .... 370/352, 493–495, 497; 379/88.11–88.13, 379/67.1–88.28; 455/412.1–414.1; 709/203, 709/206, 219
See application file for complete search history.

(56) References Cited

U.S. PATENT DOCUMENTS

| | | | | |
|---|---|---|---|---|
| 7,359,493 | B1* | 4/2008 | Wang et al. | 379/88.23 |
| 7,548,915 | B2* | 6/2009 | Ramer et al. | 1/1 |
| 7,577,665 | B2* | 8/2009 | Ramer et al. | 1/1 |
| 7,609,820 | B2* | 10/2009 | Bedingfield, Sr. | 379/88.12 |
| 7,720,681 | B2 | 5/2010 | Milstein et al. | 704/244 |
| 7,764,770 | B2* | 7/2010 | Kleinfelter et al. | 379/88.12 |
| 2002/0085690 | A1* | 7/2002 | Davidson et al. | 379/88.17 |
| 2002/0103867 | A1* | 8/2002 | Schilter | 709/206 |
| 2003/0112944 | A1* | 6/2003 | Brown et al. | 379/201.01 |
| 2003/0128820 | A1* | 7/2003 | Hirschberg et al. | 379/88.14 |
| 2005/0069095 | A1* | 3/2005 | Fellenstein et al. | 379/88.02 |
| 2006/0047518 | A1* | 3/2006 | Claudatos et al. | 704/275 |
| 2006/0156251 | A1* | 7/2006 | Suhail et al. | 715/809 |
| 2007/0078814 | A1* | 4/2007 | Flowers et al. | 707/2 |
| 2007/0101133 | A1* | 5/2007 | Liu et al. | 713/168 |
| 2007/0174388 | A1* | 7/2007 | Williams | 709/204 |
| 2007/0180060 | A1* | 8/2007 | Patel et al. | 709/219 |
| 2007/0286384 | A1* | 12/2007 | Christensen et al. | 379/201.07 |

* cited by examiner

*Primary Examiner* — Asad Nawaz
*Assistant Examiner* — Wutchung Chu
(74) *Attorney, Agent, or Firm* — Merchant & Gould

(57) ABSTRACT

Aspects of the present invention are directed to software that allows a callee to access and filter data related to a voicemail message. In accordance with one embodiment, searchable index key(s) are identified that are associated with a selected voicemail message. Then, a search is performed to identify data that is related to the selected voicemail message using the index key(s). Once the search is performed, a user interface is presented that references data identified as being related to the voicemail message. As a result, a callee may easily access and review data related to a voicemail message without being required to use multiple software applications.

19 Claims, 15 Drawing Sheets

VOICEMAIL FILTERING SOFTWARE

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, current VoIP approaches may not provide convenient access to data related to a voicemail message. A caller may want to access data related to a voicemail message using one software application that provides controls for processing received voicemail messages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at software that allows a callee to access and filter data related to a voicemail message. In accordance with one embodiment, a method is provided that identifies data (e.g., documents, e-mail messages, and the like) that is related to a voicemail message. More specifically, the method includes identifying searchable index key(s) associated with a voicemail message. Then, a search is performed to identify data that is related to the voicemail message using the index key(s). Once the search is performed, a user interface is presented that, among other things, references data identified as being related to the voicemail message. As a result, a callee may easily access and review data related to a voicemail message without being required to use multiple software applications.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Aspects of the present invention are directed at voicemail filtering software that allows a callee to access and filter data related to a voicemail message. More specifically, embodiments of the voicemail filtering software described herein are directed at gathering data related to a voicemail message from a plurality of electronic sources and presenting the data to a callee in a multi-purpose user interface. While the multi-purpose user interface is available, the callee may generate events to interact with the user interface and cause additional filtering to be performed. Although the present invention will be described in connection with an IP telephony environment, it is equally applicable to any type of digital data exchange that includes audio. Accordingly, the disclosed embodiments and examples are illustrative in nature and should not be construed as limiting.

Figure 1:
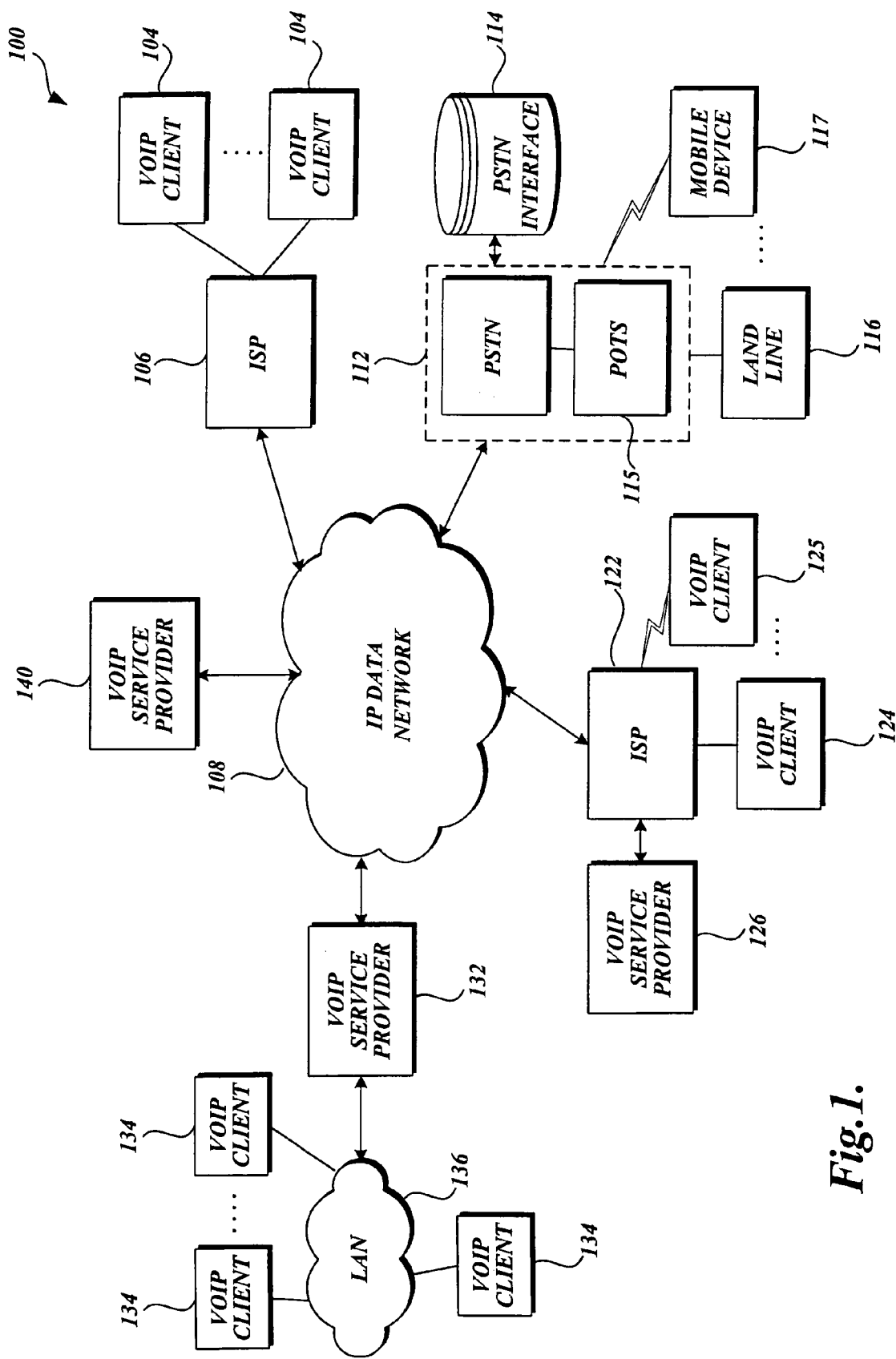
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client" or a "client," as used herein, refers to a particular contact point, such as an individual, an organization, a company, etc., one or more associated VoIP devices and a unique VoIP client identifier. For example, a single individual, five associated VoIP devices and a unique VoIP client identifier collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN), and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. The VoIP service provider 126, 132, 140 may provide a voicemail system for storing voicemail messages. VoIP clients 104, 124, 125, 136 may create, maintain, and define preferences for a voicemail box to store incoming voicemail messages. Moreover, the VoIP service providers 126, 132, 140 or VoIP clients 104, 124, 125, 136 may filter voicemail messages and/or identify data that is related to a voicemail message.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a PSTN 112. A PSTN interface 114 such as a PSTN gateway may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client based on the unique VoIP identifier of that client and the appropriate VoIP device associated with the VoIP client, will be used to establish a connection. In one example, an individual associated with the VoIP client may specify which devices are to be used in connecting a call based on a variety of conditions (e.g., connection based on the calling party, the time of day, etc.). Also, in instances when a callee is unavailable, a request may be forwarded to a VoIP client that provides a voicemail system. In this instance, a communication channel between a caller and callee is not established. Instead, a communication channel is established so that a caller may interact with the voicemail system for the purpose of leaving a voicemail message.

It is understood that the above mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
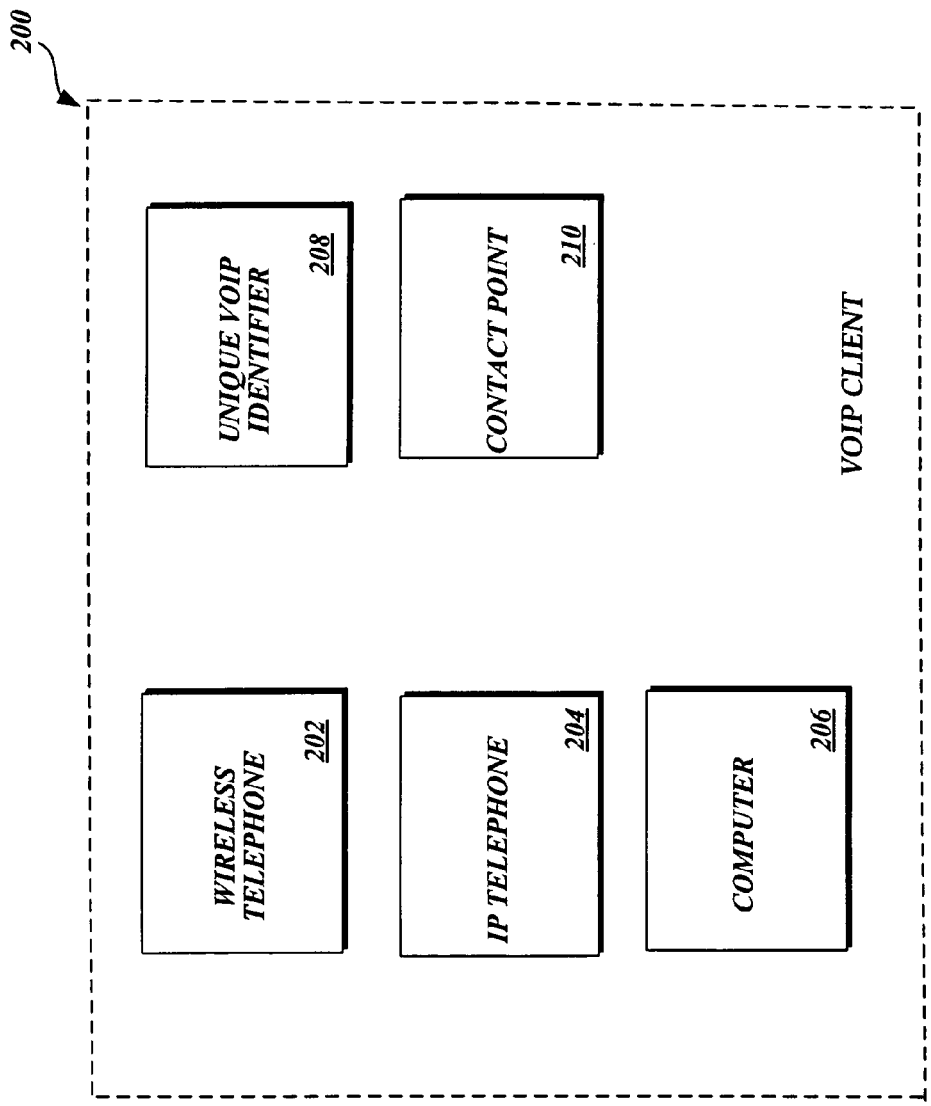
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls and voicemail messages, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. In one embodiment, an application that is part of the VoIP client 200 is configured to provide services with regard to voicemail messages. The application may include, among other things, voicemail filtering software that enables a callee to access and filter data related to a voicemail message. As described in further detail below with reference to FIGS. 7-9, the voicemail filtering software may identify relationships between voicemail messages and other electronic data that is accessible to the VoIP client 200. In this regard, the voicemail filtering software may gather data related to a voicemail message from a plurality of sources and make the data accessible from a multipurpose user interface. The VoIP client 200 also maintains one or more unique VoIP identifier 208. The unique VoIP identifier(s) 208 may be constant or change over time. For example, the unique identifier(s) 208 may change with each call. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In an alternative embodiment, the VoIP client 200 may maintain multiple VoIP identifiers. In this embodiment, a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
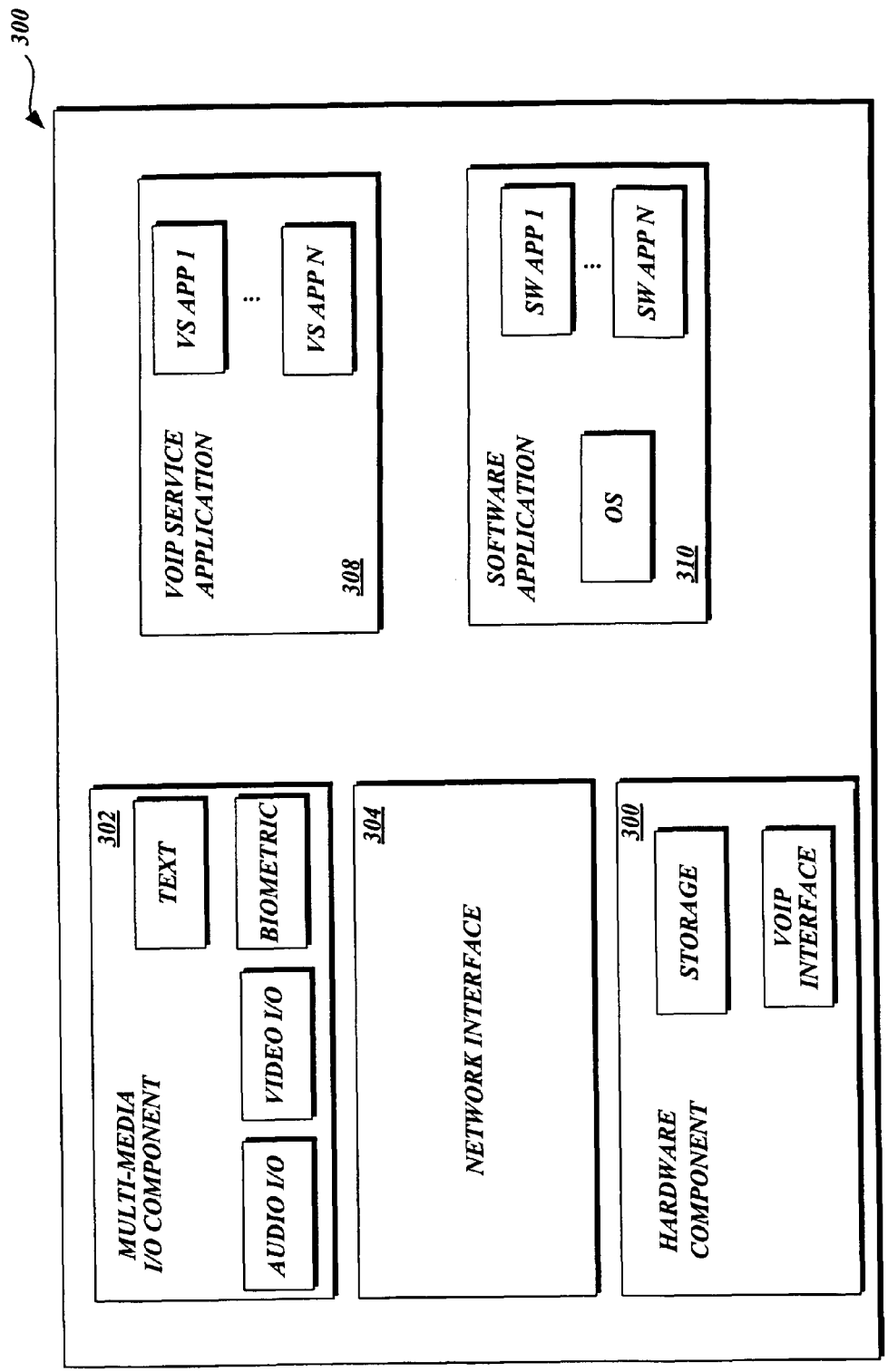
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles, user biometrics information, etc) associated with the VoIP client in which the device is included. In one embodiment, the hardware component 306 may include a VoIP interface card which allows non-VoIP client device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), and video CODEC. The CODEC may use voice profiles to filter and improve incoming audio. In one embodiment, the software application component includes an application for obtaining and processing voicemail messages. The application may be configured to obtain voicemail messages as attachments to e-mails or may be an application configured to allow individuals to send/receive calls and voicemail messages.

Figure 4A:
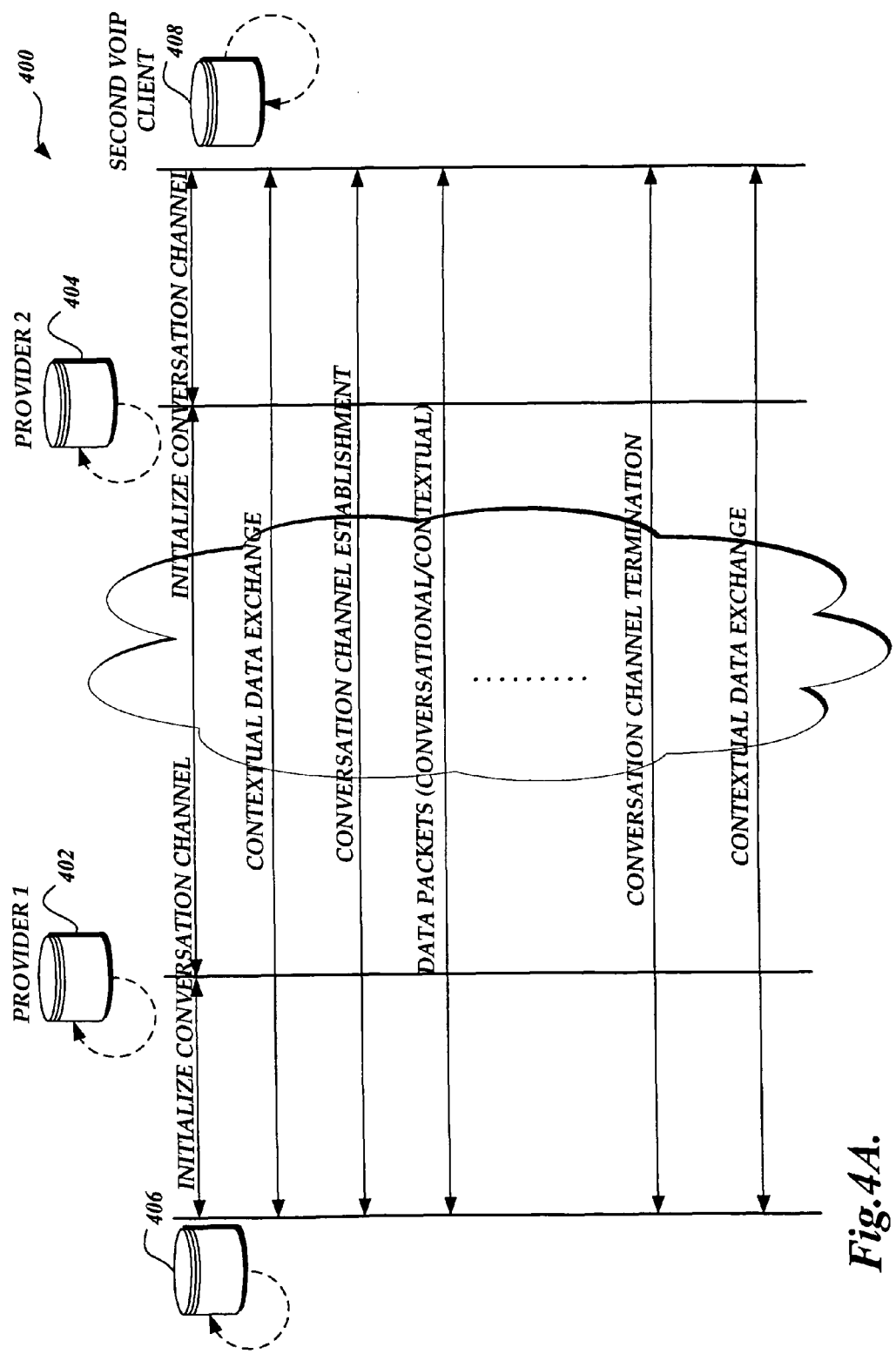
FIGS. 4A and 4B are block diagrams illustrative of the exchange of data between two VoIP clients over a conversation channel in accordance with an aspect of the present invention.

With reference to FIG. 4A, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established. In one embodiment, if a conversation channel cannot be established because a callee is unavailable, Provider 2 404 forwards the request to a client that provides a voicemail system. In this instance, the second VoIP 406 may be used to access conversation and contextual data obtained by the client that provides the voicemail system. While the discussion provided below describes the exchange of data occurring in a call, this discussion also applies to communications that are stored, such as voicemail messages.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called.

Available media types, rules of the calling client and the client being called, and the like, may also be part of the contextual information that is exchanged during the connection set-up phase. The contextual information may be processed and collected by one of the devices of the first VoIP client 406, one of the devices of the second VoIP client 408, and/or by VoIP service providers (e.g., Provider 1 402 and Provider 2 404), depending on the nature of the contextual information. In one embodiment, the VoIP service providers 402, 404 may add/or delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404 and forwarding the request to a voicemail system. The appropriate actions may be determined based on the obtained contextual information. When a conversation channel is established, a device of the first VoIP client 406 and a device of the second VoIP client 408 start communicating with each other by exchanging data packets. As will be described in greater detail, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
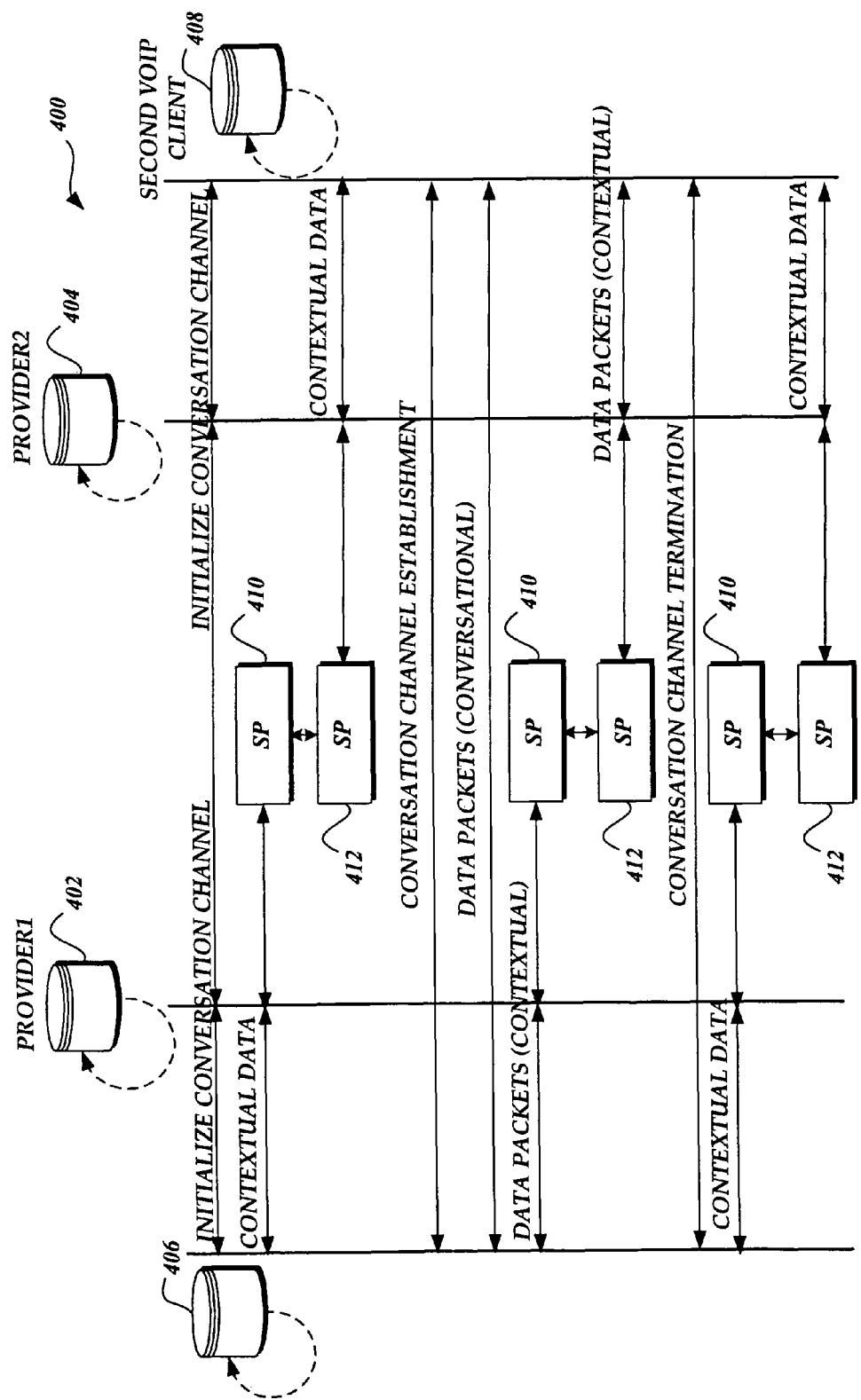

FIG. 4B is a block diagram illustrative of a conversation flow 400 between devices of two VoIP clients via several service providers, in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, a VoIP service provider 402 (Provider1) for the first VoIP client 406 receives the request to initiate a conversation channel and forwards the request to a VoIP service provider 404 (Provider2) for the second VoIP client 408.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. In one embodiment, Provider 1 402 may identify particular contextual information which Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

The contextual information may be processed and collected at a device of the first VoIP client, a device of the second VoIP client, and/or the VoIP service providers (e.g., Provider1 and Provider2), depending on the nature of the contextual information. For example, voice profiles may be collected by the service providers 402, 404, and only temporarily provided to the devices. Further, third party Service Provider(s) (third party SP) 410, 412 can obtain and/or add contextual information exchanged among devices of the first VoIP client 406 and second VoIP client 408, Provider 1 402, and Provider 2 404. In one embodiment, any of Provider 1 402, Provider 2 404, and third party SP 410, 412 may add, modify and/or delete contextual information before forwarding the contextual information to the next VoIP device(s), including other service providers.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. In one embodiment, contextual and/or conversation data packets may be forwarded to third party SPs 410, 412 from Provider 1 402, Provider 2 404, or from either VoIP client 406, 408. Further, the forwarded contextual and/or conversation data packets may be exchanged among various third party SPs 410, 412.

Figure 5:
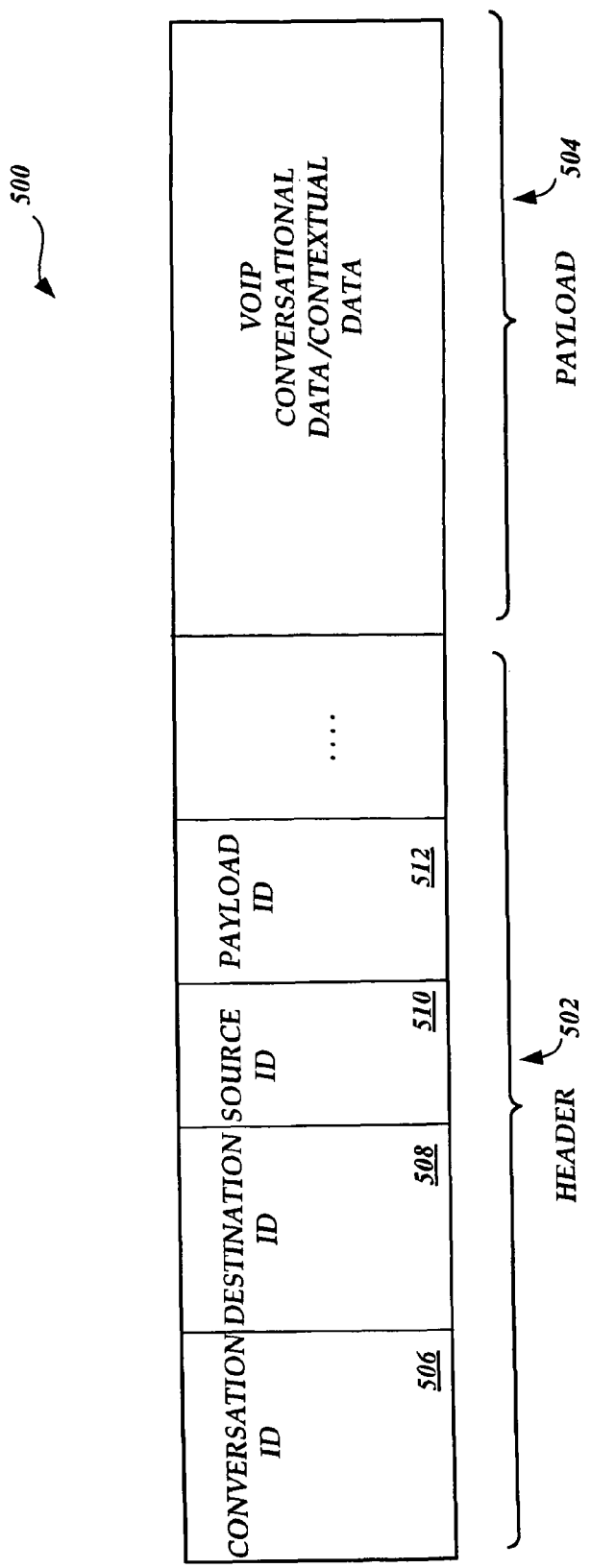
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. In this regard, a VoIP service provider or other VoIP entities may modify header information in certain circumstances. For example, if a caller is being forwarded to a voicemail system, the original destination of a data packet may be modified to a client that provides services for leaving a voicemail message.

Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying type of payload (e.g., conversation or contextual), individual ID (not shown) for identifying the individual for which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), and the like. More specifically, the contextual information may include client preference, client rules, security information such as authentication and permission levels, client's location (e.g., user location, device location, etc.), biometrics information, the client's confidential information, voicemail account configuration, VoIP device's functionality, VoIP service providers information, media type, media parameters, calling number priority, keywords, information relating to application files, and the like. The contextual information may be processed, collected, and/or disseminated at each VoIP client and/or the VoIP service providers depending on the nature of the contextual data. In one aspect, the VoIP service providers may add, modify and/or delete VoIP client's contextual data before forwarding the contextual information. For example, client's confidential information will be deleted by the VoIP service provider associated with that client unless the client authorizes such information to be transmitted. In some cases, a minimal amount of contextual information is transmitted outside of an intranet network.

Figure 6:
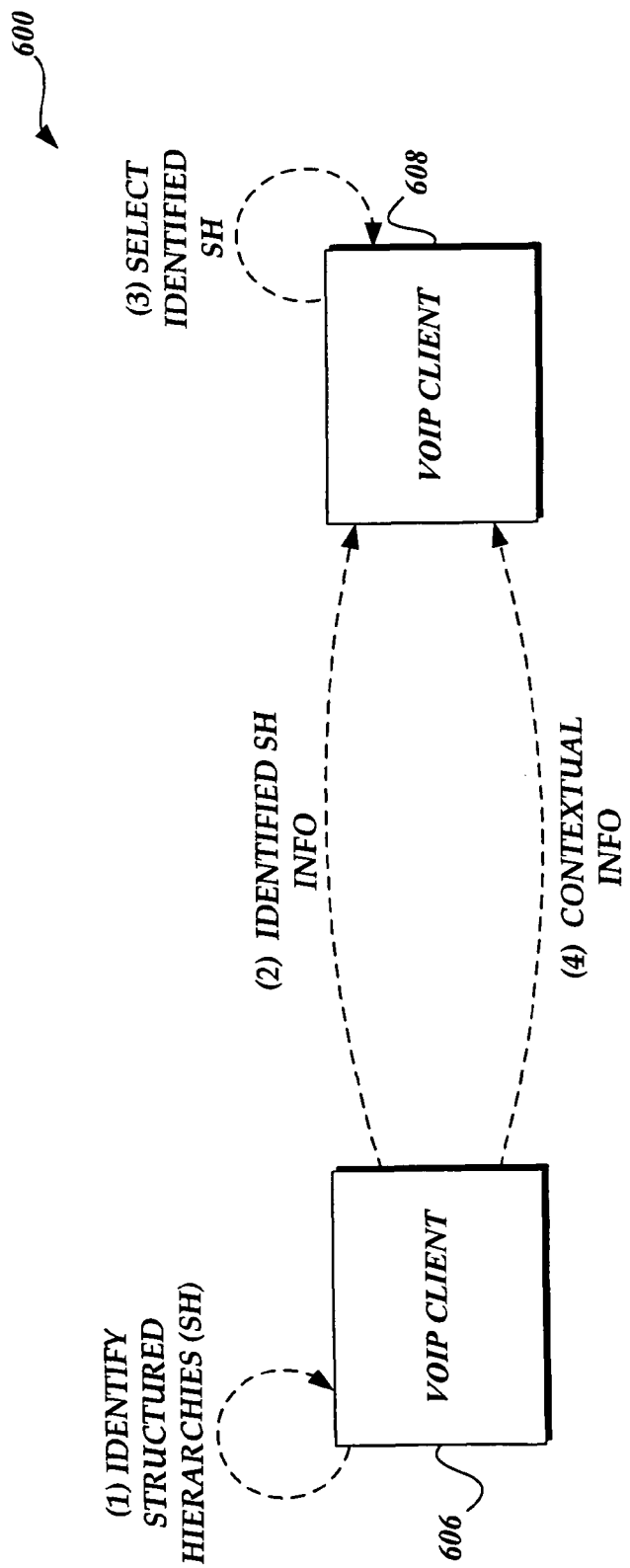
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIGS. 4A and 4B, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information about which structured hierarchy is used to carry the contextual information, VoIP Client 608 looks up predefined structured hierarchies (e.g., XML namespace, and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information. As will be described in further detail below, the exchange of contextual information may occur when a caller is leaving a voicemail message on a client that provides a voicemail system. Similarly, the exchange of contextual information may occur when a callee accesses stored voicemail messages stored on the client that stores the voicemail messages.

Now with reference to FIGS. 7-9, voicemail filtering software that, among other things, enables a callee to access and filter data related to a voicemail message will be described. Those skilled in the art and others will recognize that an Internet telephony environment 100 may include a voicemail system that allows a caller to leave an audio and/or multimodal message (e.g., audio with an electronic file) for a callee. For example, a VoIP service provider 132 may provide VoIP clients 134 with voicemail services that allow a caller to leave voicemail messages in a voice mailbox for a callee who may access received voicemail messages in any one of a number of different ways. In this regard, a service provider 132 may automatically forward a voicemail message to a client associated with the callee that includes the voicemail message. In some systems, the callee may process the voicemail message using a voicemail or e-mail application and associated media player. In existing systems, a voicemail message communicated over an Internet telephony environment 100 typically includes at least some contextual information related to the voicemail message. For example, an existing technology commonly known as "Caller ID" informs the callee of the caller's telephone number and identity.

Frequently, a voicemail message is related to other electronic data that is accessible from a client. For example, numerous modalities of communication are available from modern networks, through which users may communicate and collect electronic data including, but not limited to, e-mail, instant messaging, telephony, real-time conferencing, facsimile, and the like. Electronically stored communications may be related to other data available from a client including, but not limited to, word processing documents, spreadsheet documents, calendars and schedules, telephone numbers, contact information, etc. With existing systems, a callee may access data related to a voicemail message by (1) performing a search to identify the related data and (2) executing an appropriate software application to access the data. However, accessing data related to a voicemail message in this way is time consuming and requires working with multiple software applications. Instead, a callee may want to access data related to a voicemail message using one application that aggregates data from disparate sources, including, but not limited to, local storage media (e.g., hard drives, removable drives, etc.), Local Area Networks ("LAN") such as an intranet, Wide Area Networks ("WAN") such as the Internet, subscription services, feeds, and the like.

Generally described, embodiments of the voicemail filtering software described herein are directed at gathering data related to a voicemail message from a plurality of electronic sources and making the data available from a multi-purpose user interface. While the multi-purpose user interface is accessible, the callee may generate events to, among other things, (1) perform additional searching or "filtering" of the data; (2) access data identified as being related to a voicemail message; and/or (3) initiate a call connection based on the data made available from the multi-purpose user interface.

Now with reference to FIG. 7, a dashboard generation routine 700 that provides a multi-purpose user interface will be described. In one embodiment, the dashboard generation routine 700 pre-fetches data related to a voicemail message. Then, a multi-purpose user interface is generated that has a plurality of display areas. As illustrated in FIG. 7, the dashboard generation routine 700 begins at block 702 when the selection of a voicemail message is received. As mentioned previously, a callee may receive and access voicemail messages in a number of different ways. Typically, VoIP clients 134 access voicemail messages from a VoIP service provider 132 using an application program such as a voicemail application program, an e-mail application program, etc. In this instance and by way of example only, a callee may select a voicemail message using controls provided by an existing program. In other instances, a voicemail message may be selected, at block 702, using traditional navigation techniques wherein a callee navigates a file system and selects a file that contains the voicemail message. However, those skilled in the art and others will recognize that a selection of a voicemail message may be received, at block 702, using other techniques and the examples provided above should be construed as exemplary and not limiting.

At decision block 704, the dashboard generation routine 700 remains idle until a command is issued to generate a multi-purpose user interface (e.g., "dashboard") that allows a callee to access and filter data related to a voicemail message. In accordance with one embodiment, the multi-purpose user interface provided by the present invention is accessed from a voicemail application program that manages voicemail messages received by a callee. In one embodiment, a control (e.g., button, menu item, etc.) accessible from the voicemail application program allows the callee to "drill down" and access data identified as being related to a voicemail message. For example, a callee may "right click" on an entry that represents a voicemail message to access a "pop-up" menu. When the appropriate menu item is selected from the "pop-up" menu, the dashboard generation routine 700 receives notice, at block 704, that a command to generate the multi-purpose user interface was received. In alternative embodiments, aspects of the present invention may be implemented as a stand-alone application. In this and other instances, the command to generate the multi-purpose user interface may be generated in other ways known in the art without departing from the scope of the claimed subject matter.

Figure 7:
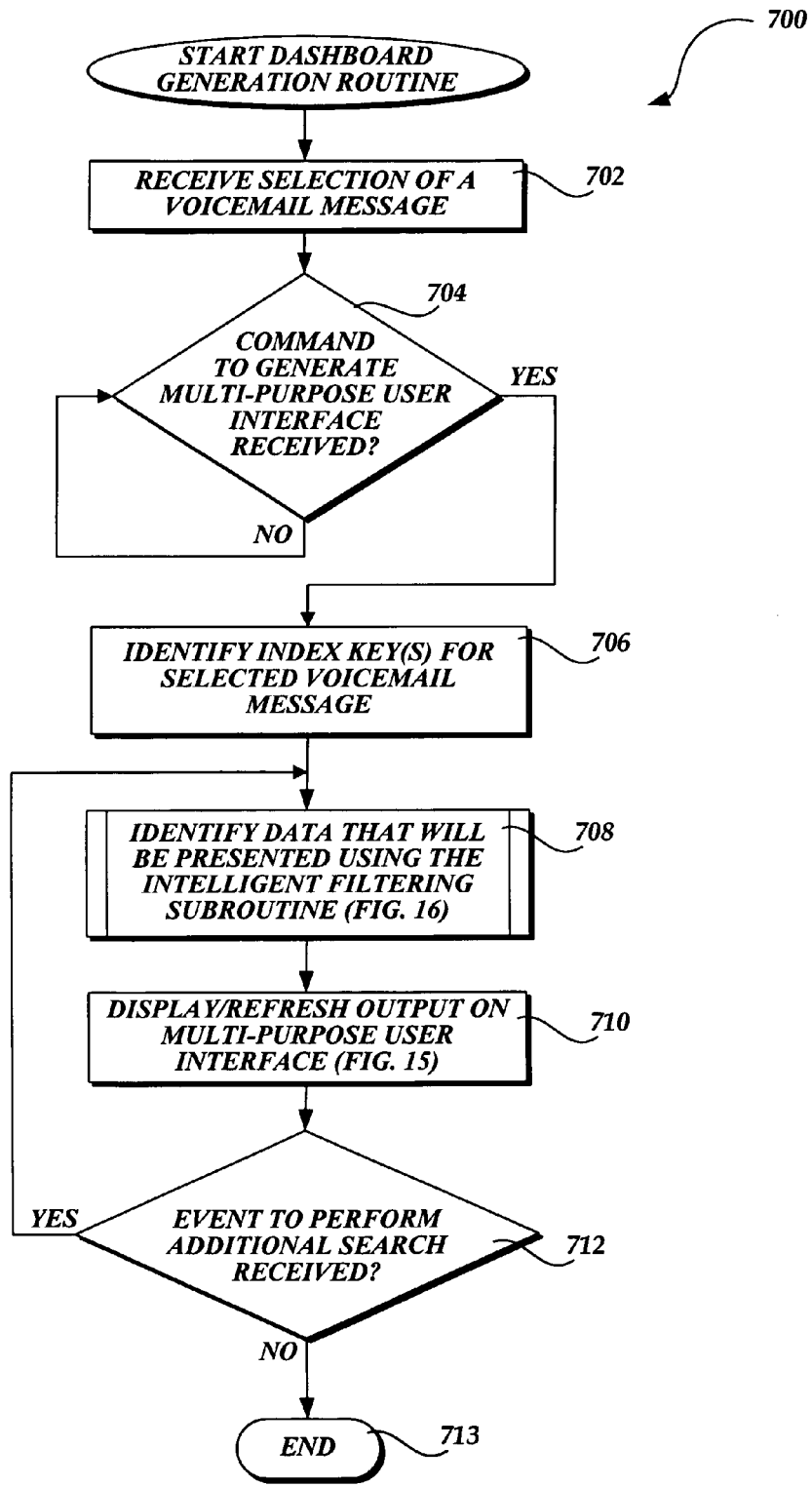
FIG. 7 is a flow diagram of a dashboard generation routine for providing a multi-purpose user interface that provides access to data related to a voicemail message.

As further illustrated in FIG. 7, at block 706, the dashboard generation routine 700 identifies the index key(s) associated with the voicemail message selected at block 702. Generally described, index keys are character strings that are extracted from metadata included with a selected voicemail message. In one embodiment, a stream of data packets in a voicemail message, including both conversational data packets and contextual data packets, are processed before being stored in a callee's voicemail box. The processing performed includes, but is not limited to, (1) identifying contextual information associated with a voicemail message; and/or (2) "mining" information in the body of a voicemail message. Moreover, the contextual information identified, which includes any data "mined" from the body of the voicemail message, is referenced in contextual data of an electronic file that contains the voicemail message. The index key(s) may be defined and exchanged as a subset of contextual information. In one embodiment, the subset of contextual information that includes the index key(s) is defined in the Call Context Class 1010, described in further detail below with reference to FIG. 11. On the receiving client, the index key(s) are identified with the use of a search expression that parses structured hierarchies. As described in further detail below, the index key(s) identified, at block 706, are used to search for other data that is related to the selected voicemail message and may include, but is not limited to, the caller identity, subject, and/or keyword(s), etc.

It should be well understood that an index key may be identified automatically using a search expression that parses data included with a voicemail message. Alternatively and as described in further detail below, an index key may be defined by a caller or callee who inputs the index key(s). To define how a search for data related to a voicemail message will be performed, in instances when the index key(s) are defined by a caller or callee, previously received voicemail messages may be repeatedly "mined" to determine whether these messages are related to another voicemail message or real-time communication. Stated differently, a callee's received voicemail messages may be repeatedly searched using different index keys when additional voicemail messages, real-time communications, search requests, etc. are received.

At block 708 data that will be presented on a multi-purpose user interface is identified using the intelligent filtering subroutine 900. The intelligent filtering subroutine 900 is described in further detail below with reference to FIG. 9. However, generally described, the intelligent filtering subroutine 900 identifies data accessible from a client associated with the callee that is related to a voicemail message or real-time communication. In this regard, the intelligent filtering subroutine 900 may query a local or remote file system, network location, subscription service, or feed for data that matches one or more of the index key(s) identified at block 706. As described in further detail below, data that matches the query generated by the intelligent filtering subroutine 900 may be referenced in display regions available to the callee from the multi-purpose user interface.

At block 710, a multi-purpose user interface that references data identified from potentially many disparate sources is presented to the callee. Generally described, modern graphical user interfaces communicate with a user by employing readily understandable controls such as icons, scroll bars, buttons, links, menus, etc. The multi-purpose user interface displayed at block 710 includes these types of readily understandable controls that enable a callee to (1) perform filtering for data that is related to a voicemail message or real-time communication; (2) access data identified as being related to a voicemail message or real-time communication that is in different electronic formats; and/or (3) initiate a call connection to a contact.

Figure 8:
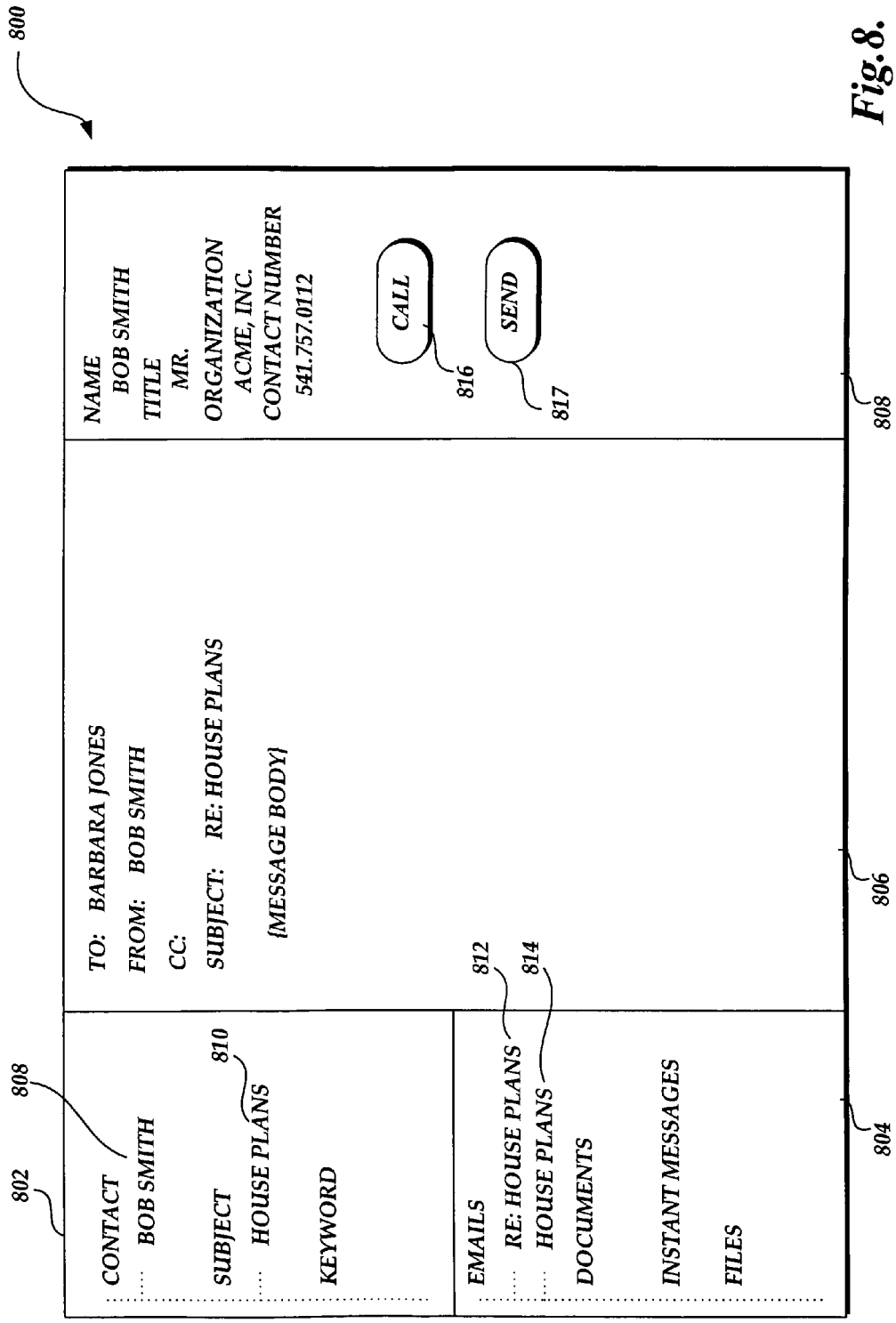
FIG. 8 is an exemplary pictorial depiction of an exemplary multi-purpose user interface that may be used to interact with a callee in accordance with an aspect of the present invention.

For illustrative purposes and by way of example only, an exemplary multi-purpose user interface 800 that may be presented to the callee, at block 710, is depicted in FIG. 8. In the embodiment illustrated in FIG. 8, the multi-purpose user interface 800 includes four display regions including the index tree region 802, content tree region 804, reading pane region 806, and call launch region 808. Each of the display regions 800, 802, 804, and 806 present different types of data and/or controls that may be useful in processing a voicemail message.

The index tree region 802 presents the index key values used to identify data that is related to a voicemail message. As mentioned briefly above, index key(s) defined in the Call Context Class 1010 (FIG. 11) and extracted from contextual data of a voicemail message, or defined by a caller/callee, may be used by the smart filtering subroutine 900 (FIG. 9) to search a local or remote file system, network location, etc. In the example depicted in FIG. 8, the value for the "caller" and "subject" index keys is represented by the "BOB SMITH" entry 808 and the "HOUSE PLANS" entry 810, respectively. In this example, the value for the "keyword" index key is "null" as a keyword was either not available or not sufficiently relevant. Typically, the value for a given index key is readily accessible and definitively known. However, in some instances, an index key may be ambiguous or incorrectly identified. For example, if metadata extracted from a voicemail message indicates that "Bob Smith" is the caller that left a voicemail message, a database commonly known as an address book may be queried. The database may have multiple entries for contacts with the name of "Bob Smith" or an equivalent name (e.g., "Robert Smith"). In this instance, multiple entries for the caller index key may be presented on the multi-purpose user interface 800. As described in further detail below, by selecting and/or modifying index key entries, a callee may define how additional filtering for data related to a voicemail message will be performed.

The content tree region 804 on the multi-purpose user interface 800 includes references to data identified as being related to a voicemail message by the smart filtering subroutine 900. As described in further detail below, the smart filtering subroutine 900 queries a local or remote file system, network location, and the like, for data such as e-mails, documents, Web pages, and other on-line content that are related to a voicemail message. In one embodiment, the results of the query are displayed in the content tree region 804 where the data may be accessed by the callee. In the example illustrated in FIG. 8, two e-mails were identified as being related to a voicemail message that are referenced by the "RE: HOUSE PLANS" entry 812 and the "HOUSE PLANS" entry 814.

In accordance with one embodiment, the data identified as being the most relevant to a voicemail message is displayed by default in the reading pane region 806. In the example illustrated in FIG. 8, an e-mail referenced by the "RE: HOUSE PLANS" entry 812 is displayed in the reading pane region 806. Since the multi-purpose user interface 800 is independent of a specific application, it may display data that is in different electronic formats. For example, a callee may rely on the multi-purpose user interface 800 to display data that is formatted for an e-mail application, a voicemail application, a word processing application, Web browser, etc. Moreover, by selecting between entries presented in the content tree region 804, the callee may change the data that is displayed at the reading pane region 806.

In this exemplary embodiment, the multi-purpose user interface 800 includes a call launch region 808 that includes a call button 816 and a send button 817. From the multi-purpose user interface 800, a callee may cause contextual data to be transmitted to a specified contact when a call is initiated, or sometime thereafter, using controls available from the call launch region 808. For example, entries presented in the content tree region 804 may be selected by the callee and added to the call launch region 808 using a technique known as "drag-and-drop." When activated, the call button 816 causes a telephone call to be made to the specified contact. In this example, the entries added to the call launch region 808 are transmitted to the specified contact when the call is initiated, or sometime thereafter. As a result, when the specified contact receives the call, any e-mail, document, Web page, etc., selected by the callee is also transmitted as contextual data. Similarly, when the "SEND" button 817 is activated, any contextual data added to the call launch region 808 is transmitted to the specified contact. However, in this instance, a call connection is not initiated and data is transmitted in response to a received voicemail message. If a call connection is established when the send button 817 is activated, a file may be transmitted over an established communication channel during the call. As described in further detail below, this type of contextual information that is exchanged when the "CALL" button 816 or "SEND" button 817 is activated may correspond to the Call Context Class 1010, described in further detail below with reference to FIG. 11. As further illustrated in FIG. 8, the call launch region 808 depicted in FIG. 8 includes detailed information about a contact that may be accessed from a database (e.g., address book). In this and other examples, the multi-purpose user interface 800 is interactive in that a callee may identify a different contact if the contact presented, by default, is not the desired contact.

While a specific example of an exemplary multi-purpose user interface 800 has been described above with reference to FIG. 8, those skilled in the art and others will recognize that the features provided by the present invention may be implemented using a different type of interface or an interface with different types of controls. For example, the multi-purpose user interface 800 does not have to be a graphical user interface, but may be rendered as a text display, accessed from an audio menu, etc. Thus, the example graphical user interface provided above should be construed as exemplary and not limiting.

Returning to FIG. 7, at decision block 712, the dashboard generation routine 700 determines whether an event to perform an additional search was received. When the multi-purpose user interface 700 is available to the callee, different types of events may be generated, including an event directed at causing an additional search to be performed. This type of event may be generated in a number of different ways. For example, the index key(s) that were used by default to identify data related to a voicemail message are presented on the index tree region 802. A callee may redefine how a search is performed by selecting different index keys. Similarly, the callee may enter a previously unidentified index key into the index key tree region 802 and perform a search with the callee-defined index key. In instances when an event is received to perform additional searching, the dashboard generation routine 700 proceeds back to block 708, and blocks 708 through 712 repeat until an additional search does not need to be performed. Conversely, if the results of the test performed at block 712 is "no," the dashboard generation routine 700 proceeds to block 714, where it terminates.

Now with reference to FIG. 9, an exemplary smart filtering subroutine 900 briefly mentioned above, will be described in more detail. Generally described, the smart filtering subroutine 900 is used to identify data available from a client associated with a callee that is related to a voicemail message. In one embodiment, the smart filtering subroutine 900 is initially called to identify data that will be presented by default in the multi-purpose user interface 800 (FIG. 8). If a callee generates an event that requires an additional search to be performed, the smart filtering subroutine 900 may be successively called to perform an additional search based on the input received from the callee. As an initial matter, index key(s) associated with a selected voicemail message are passed to the smart filtering subroutine 900 when called. Based on the index key(s) received, the smart filtering retained 900 returns search results that reference data from potentially disparate sources that are related to a voicemail message.

Figure 9:
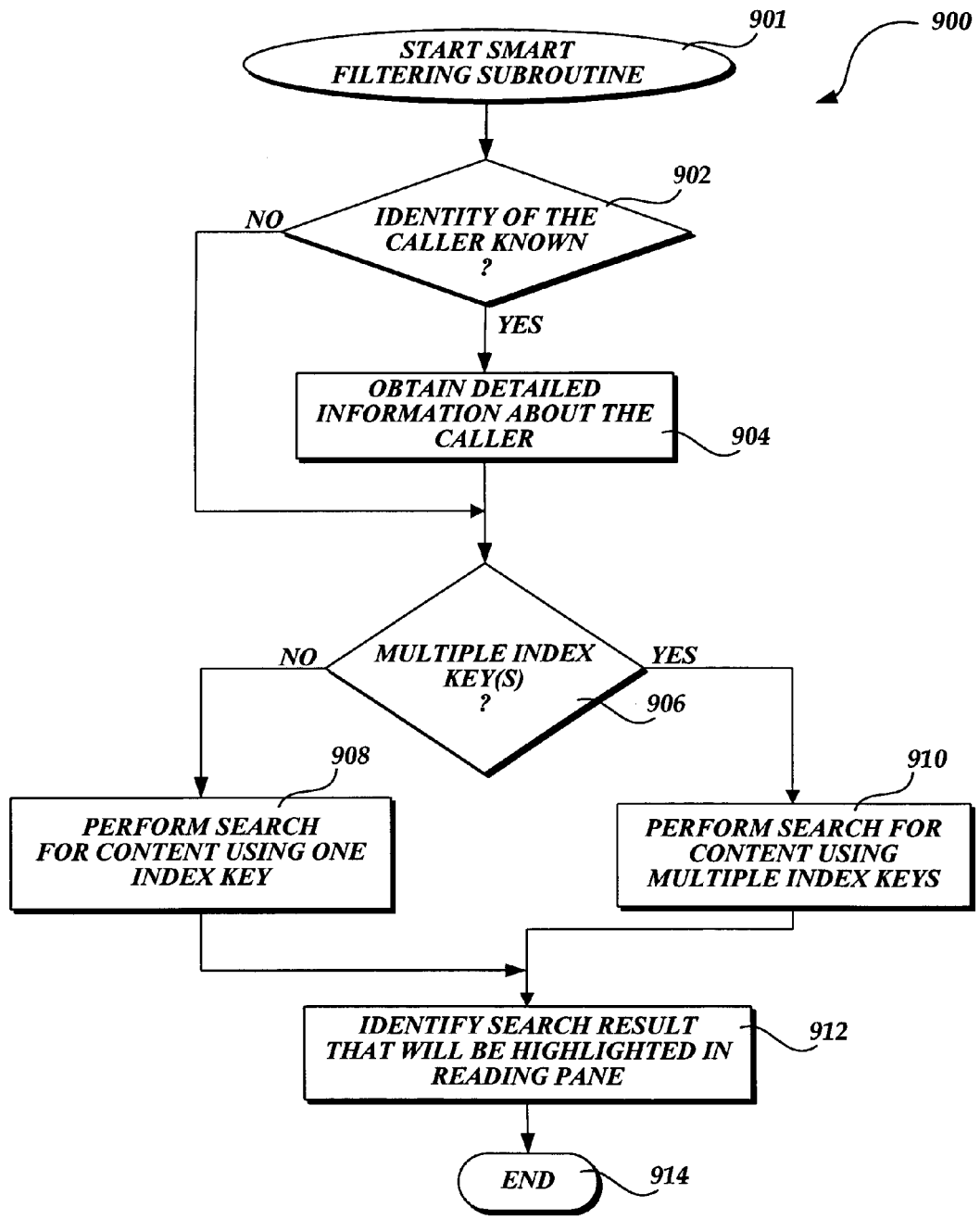
FIG. 9 is a flow diagram of a smart filtering subroutine for identifying data that is related to a voicemail message.

As illustrated in FIG. 9, the smart filtering subroutine 900 begins at block 901, and at decision block 902 a determination is made regarding whether the identity of the caller is known. As mentioned previously, a voicemail message communicated over an Internet telephony environment 100 will typically be associated with at least some contextual information. Sometimes, the contextual information is extensive and includes information relating to VoIP clients, devices, conversation channel connections (e.g., call basics 1002), conversation context (e.g., call context 1004), and the like. In other circumstances, the contextual information may be limited if, for example, a voicemail message originated from a POTS telephone. However, in either of these instances, a voicemail message may include contextual information transmitted in accordance with defined structured hierarchies such as the structural hierarchies described below with reference to FIGS. 10-13. At block 902, the smart filtering subroutine 900 determines whether the identity of the caller is known by identifying whether an index key that includes the caller's identity was either included with the voicemail message, heuristically identified, or input by a callee. If a caller index key is available, the smart filtering subroutine 900 proceeds to block 904. Conversely, if the identity of the caller is not known, the smart filtering subroutine 900 proceeds to block 906, described in further detail below.

At block 904, detailed information about the caller of a voicemail message is obtained, if available. Those skilled in the art and others will recognize that a database or other data store available to a callee may catalog information about the callee's contacts. For example, e-mail applications frequently maintain an address book that itemizes information about a callee's contacts such as name, title, organization, telephone number, e-mail address, and the like. If block 904 is reached, the name of the caller is known and a lookup is performed, at block 904, to obtain information about the caller. Stated differently, data exchanged in the context of the Call Basics Class 1002 (FIG. 11) and the Call Context Class 1004 (FIG.

14) may be compared to identify a match from an address book. Unfortunately, multiple entries for the same name may be retrieved from an address book; or, conversely, a match to a particular name may not be available from an address book. In instances when multiple entries for the same name are retrieved, all of the names may be presented to the callee on the multi-purpose user interface 800 (FIG. 8). If a match to a particular name is not available, the callee may be prompted to provide information about the contact so that the voicemail message may be accurately attributed to the correct contact.

At decision block 906, a determination is made regarding whether a search will be performed based on one or multiple index keys. As described in further detail below, different types of searches for data related to a voicemail message are performed depending on the number of index keys that are available to the smart filtering subroutine 900. If a search will be performed based on a single index key, the smart filtering subroutine proceeds to block 908. Conversely, if a search will be performed based on multiple index keys, the smart filtering subroutine proceeds to block 910, described in further detail below.

As illustrated in FIG. 9, at block 908, the smart filtering subroutine 900 causes a search to be performed for data that is related to a voicemail message using one index key. A query that uses one index key as a search term is generated and passed to an information retrieval program in order to perform the search, at block 908. In an illustrative embodiment, the query includes a request to identify all data that matches the index key in which the callee, identified by a user identifier, may access on a local or remote file system, network location, etc. Additionally, the query may include any number of additional criteria for matching data such as restrictions on file types, date ranges, etc. The information retrieval program may accept the query and use a variety of searching systems to identify data that matches the index key. In accordance with one embodiment, the information retrieval program generates a value to measure how relevant a search result is to the index key. If a search result ranks above a predetermined threshold value, the data is presented to the callee on the multi-purpose user interface 800. However, those skilled in the art and others will recognize that other techniques may be used to identify search results.

As illustrated in FIG. 9, at block 910, the smart filtering subroutine 900 causes a search to be performed for content that is related to a voicemail message. Similar to the description provided above, at block 908, a query is passed to an information retrieval program in order to perform a search, at block 910. However, in this instance, multiple index keys are passed to the information retrieval program and used as search terms. In an illustrative embodiment, data that matches the intersection of all the index keys are identified as being related to a voicemail message. Stated differently, in this example, only data that is identified as being related to every index key passed to the information retrieved program is returned as a match. In another embodiment, the information retrieval program uses all of the index keys to generate a value that measures the relevance of a search result to the index keys. In this instance, if a search result ranks above a predetermined threshold value, the search result is presented to the callee on the multi-purpose user interface 800.

At block 912, the smart filtering subroutine 900 identifies the search result that will be highlighted on the multi-purpose user interface 800. As mentioned above with reference to FIG. 8, data identified as being the most relevant to a voicemail message may be highlighted by being displayed in a reading pane 806. In instances when a value is calculated that measures the relevance of a search result, the highest ranking search result will typically be highlighted on the multi-purpose user interface 800. However, in other embodiments, the highlighted data may be identified using another criteria. For example, if the caller who left the voicemail message included contextual data, such as a document, e-mail, etc., with the voicemail message, the contextual information provided may be highlighted. Stated differently, data exchanged in the context of the call context class 1004 (FIG. 11) may be given a higher weighted value than other data and may be highlighted by default, depending on the configuration of the voicemail filtering software. Then, the smart filtering subroutine 900 proceeds to block 914, where it terminates.

With reference to FIGS. 10-14, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 1000. In one embodiment, the VoIP namespace 1000 is represented as a hierarchically structured tree of nodes, each node corresponding to a subclass which corresponds to a subset of VoIP contextual information. For example, a VoIP Namespace 1000 may be defined as a hierarchically structured tree comprising a Call Basics Class 1002, a Call Contexts Class 1010, a Device Type Class 1020, a VoIP Client Class 1030, and the like.

Figure 10:
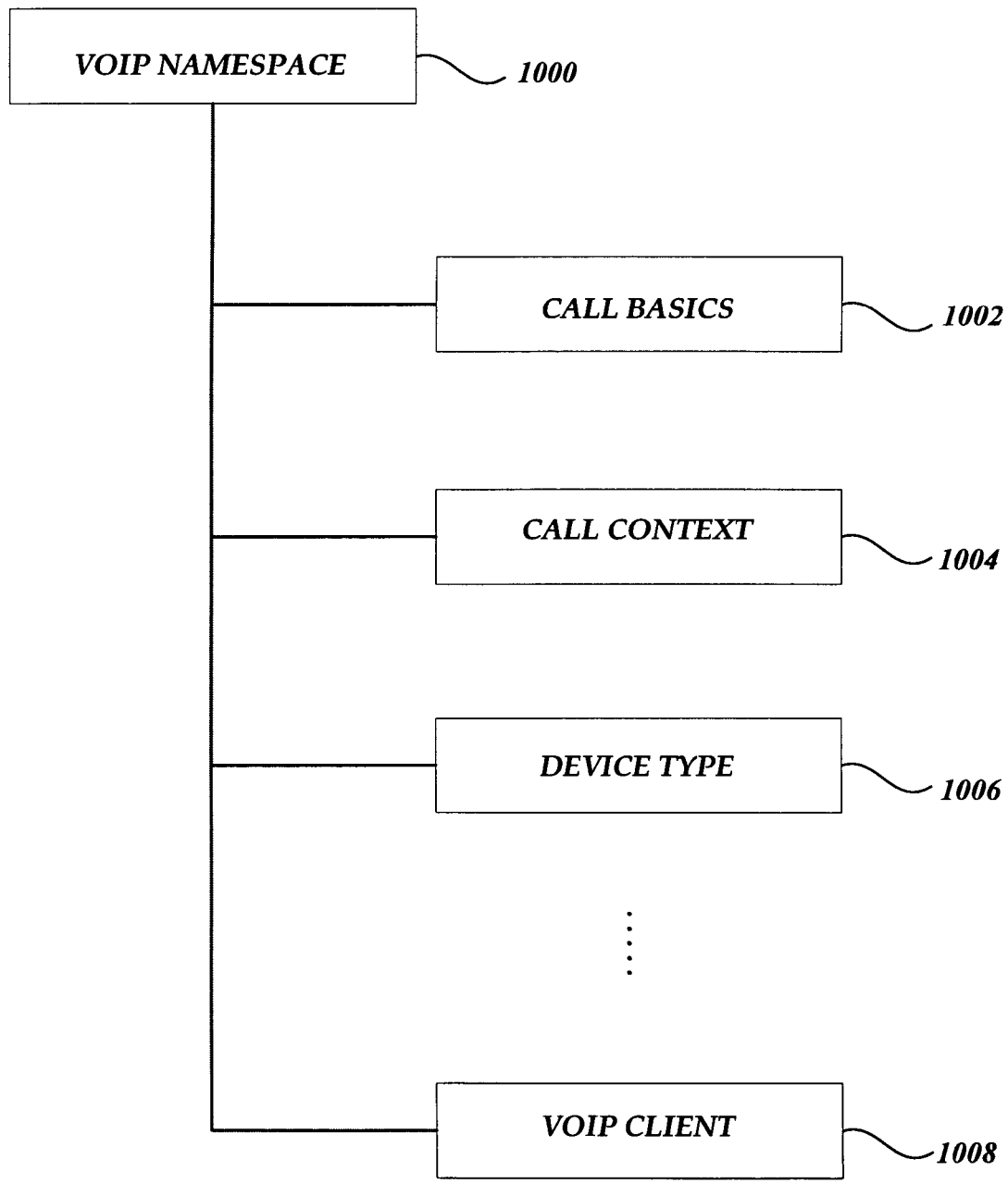
FIGS. 10-14 are block diagrams illustrative of various attribute and classes of structured hierarchies corresponding to VoIP contextual information in accordance with an aspect of the present invention.

With reference to FIG. 10, a block diagram of a Call Basics Class 1002 is shown. In an illustrative embodiment, Call Basics Class 1002 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), caller identity, destination numbers (e.g., callees' VoIP ID numbers or telephone numbers), call connection time, VoIP service provider related information, and/or ISP related information such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, a wireless/mobile device to application ("BOT"), gadget, or agent communication, to leave or receive a voicemail message, and so forth. In one embodiment, a Call Basics Class 1002 may be defined as a sub-tree structure of a VoIP Namespace 1000, which includes nodes such as call priority 1003, namespace information 1004, call type 1005, destination numbers 1006, service provider 1007, predefined identifiers 1008, and the like.

Figure 11:
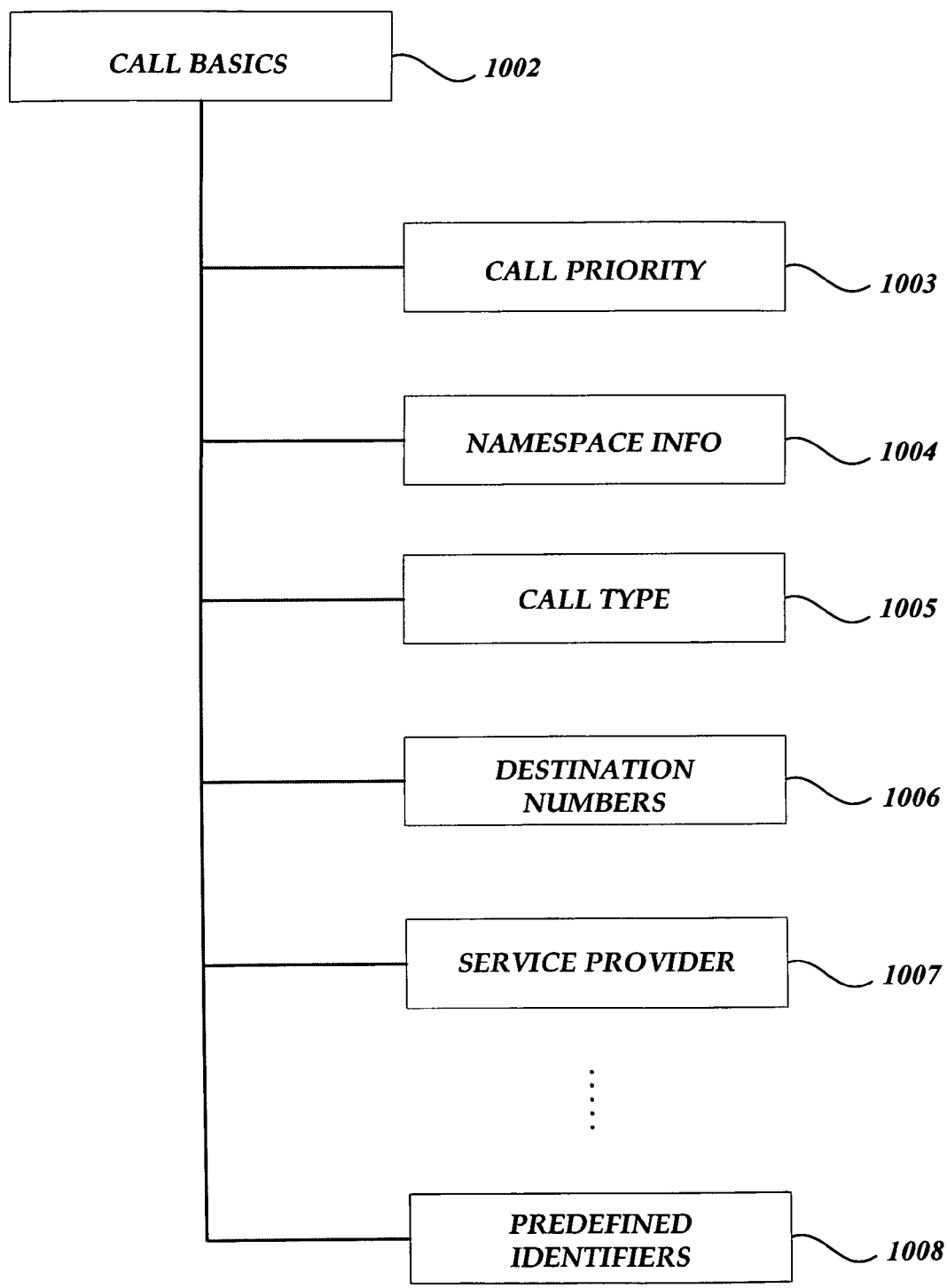

With reference to FIG. 11, a block diagram of a Call Contexts Class 1010 is shown. In one embodiment, a subset of VoIP contextual information relating to conversation context may correspond to the Call Contexts Class 1010. The contextual information relating to conversation context may include information such as client supplied keywords, identified keywords from document file data, identified keywords from a conversation data packet (e.g., conversation keywords), index keys, file names for documents and/or multimedia files exchanged as part of the conversation, and file identification (such as a case number, a matter number, and the like relating to a conversation), among many others. In accordance with an illustrative embodiment, a Call Contexts Class 1010 may be defined as a sub-tree structure of a VoIP Namespace 1000, which includes nodes corresponding to file identification 1012, client supplied keyword 1013, conversation keyword 1014, frequency of use 1015, subject of the conversation 1016, and the like.

Figure 12:
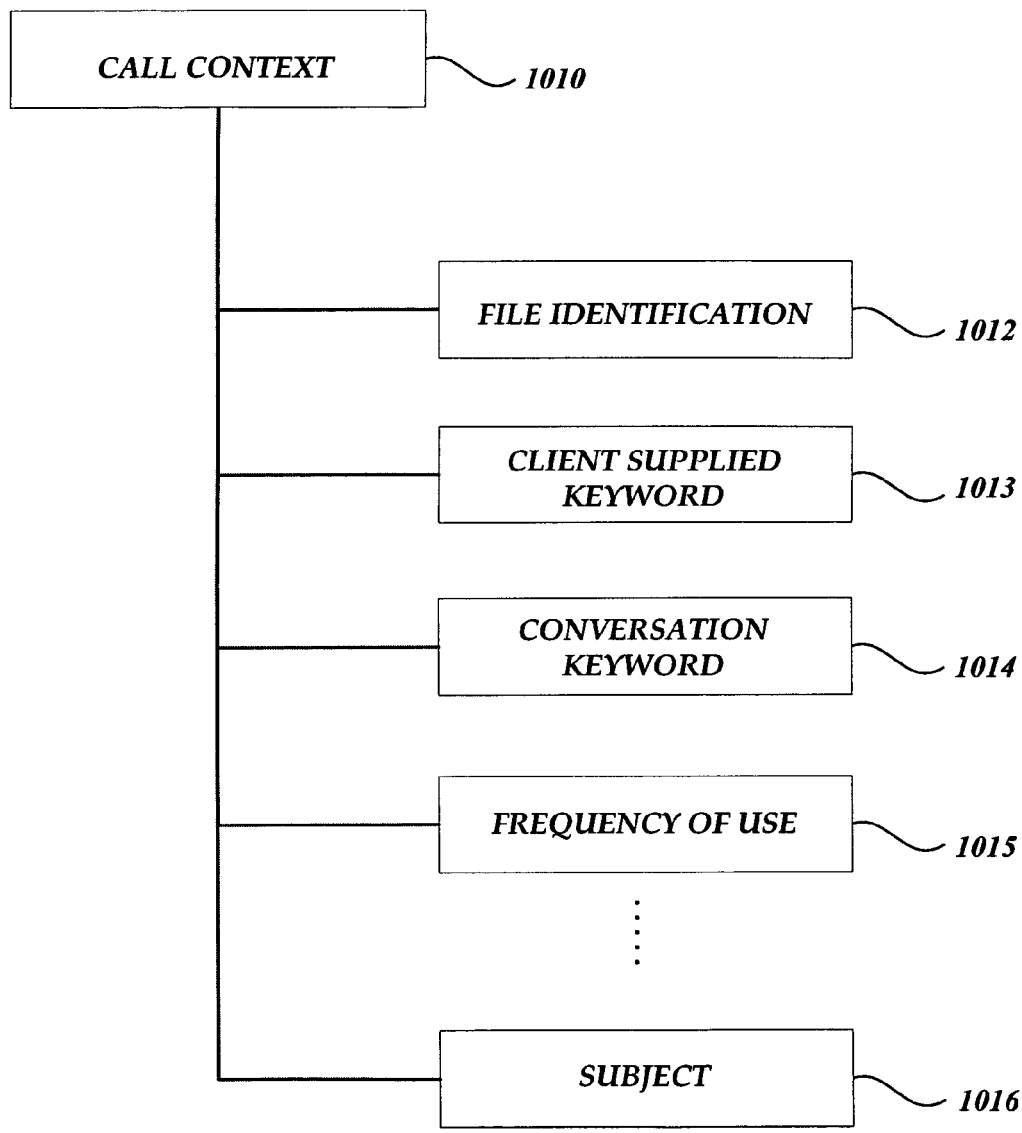

With reference to FIG. 12, a block diagram of a Device Type Class 1020 is depicted. In one embodiment, a Device Type Class 1020 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 1020 may be defined as a sub-tree structure of a VoIP Namespace 1000, which includes nodes corresponding to Audio 1022, Video 1024, Device Specific 1026, and the like.

Figure 13:
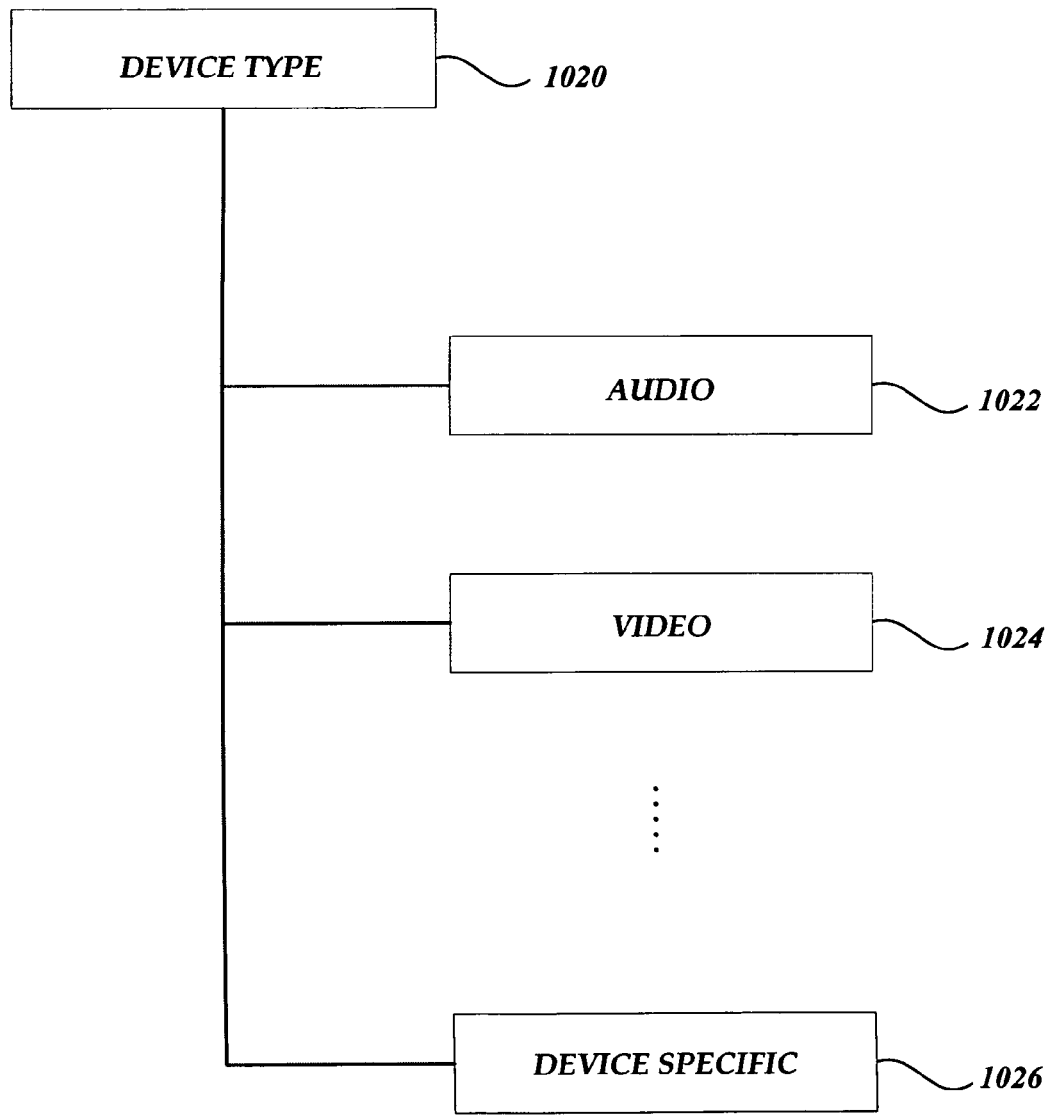
Figure 14:
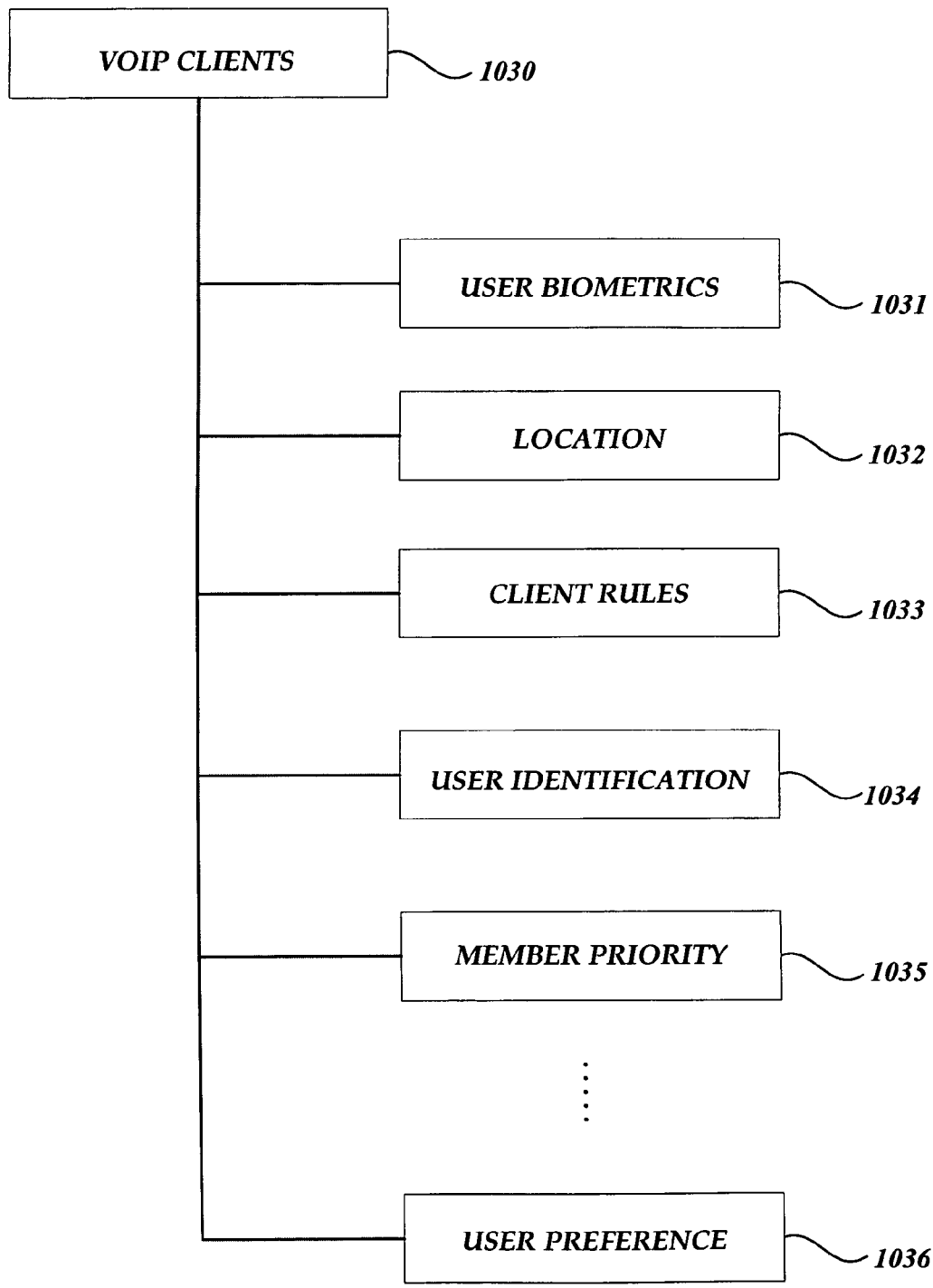

With reference to FIG. 13, a block diagram of a VoIP Client Class 1030 is depicted. In accordance with an illustrative embodiment, a VoIP Client Class 1030 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, voicemail account configuration, and biometric information, assigned phone number, user contact information (such as name, address, company, and the like), rules defined by the client, privacy settings, forwarding restrictions, user preferences, digital rights management (DRM), a member rank of an individual user in an organization, and the like. In one embodiment, a VoIP Client Class 1030 may be defined as a sub-tree structure of a VoIP Namespace 1000, which includes nodes corresponding to user biometrics 1031, location 1032, client rules 1033, user identification 1034, member priority 1035, user preference 1036, and the like.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a digital voice communication environment operative to transmit a voicemail message to a client associated with a callee, a method of providing the callee with access to data related to the voicemail message, the method comprising:
processing a voicemail message that comprises contextual data packets that carry information relating to data other than conversation data and conversational data packets that carry conversation data; wherein the processing accesses the contextual data packets within the voicemail message to identify contextual information;
using the contextual information that is obtained from the contextual data packets to identify external data from the voicemail message available from the client that is identified as being related to the voicemail message by performing a search; wherein the data is obtained from a source external to the voicemail message and comprises electronic messages and electronic files; and
providing a user interface that displays the data identified as being related to the voicemail message, wherein the user interface includes different display regions comprising: an index tree region that presents index key values used to identify data that is related to the voicemail message and provides an option to receive another index key that is used to search for related data to the voicemail message; a content tree region that displays a selectable list of the data determined to be related to the voicemail message; a reading pane region that displays the selected data in different formats; and a call launch region that includes options for transmitting contextual data to a specified contact when a call is initiated, and
wherein using contextual information included with the voicemail message to identify data available from the client that is related to the voicemail message, includes:
extracting an index key from a file that stores the voicemail message;
wherein the index key is definable by the callee; and
causing an information retrieval program to perform a search using the index key as a search term.

2. The method as recited in claim 1, wherein the data identified as being related to the voicemail message that is accessible from the user interface is in different electronic formats.

3. The method as recited in claim 1, wherein extracting an index key from a file that stores the voicemail message includes using a search expression to parse contextual data in the file.

4. The method as recited in claim 1, wherein causing an information retrieval program to perform a search using the index key as a search term includes:
generating a query designed to identify data that matches the index key; and
receiving the search results of the query.

5. The method as recited in claim 4, wherein the user interface includes a plurality of display areas that present the index key used to perform the search and the search results of the query.

6. The method as recited in claim 1, wherein providing a user interface where the callee accesses the data identified as being related to the voicemail message includes:
identifying the search result that is the most relevant to the voicemail message; and
highlighting the data that was identified as being the most relevant to the voicemail message on the user interface.

7. A memory encoded with computer-readable instructions which, when executed in a client that receives a voicemail message over an Internet telephony environment, performs a method of providing a callee with access to data related to the voicemail message, the method comprising:
processing a voicemail message that comprises contextual data packets that carry information relating to data other than conversation data and conversational data packets that carry conversation data; wherein the processing accesses the contextual data packets to identify an index key associated with the voicemail message;
performing a search for external data comprising electronic messages and files that is related to the voicemail message using the index key as a search term; and generating a user interface that references data identified as being related to the voicemail message and comprises different display regions comprising: an index tree region that presents index key values used to identify data that is related to the voicemail message and provides an option to receive another index key that is used to search for related data to the voicemail message; a content tree region that displays a selectable list of the data determined to be related to the voicemail message; and a reading pane region that displays the selected data in different formats, and wherein using contextual information included with the voicemail message to identify data available from the client that is related to the voicemail message, includes:

extracting an index key from a file that stores the voicemail message;

wherein the index key is definable by the callee; and causing an information retrieval program to perform a search using the index key as a search term.

8. The memory as recited in claim 7, further comprising handling an event received by the user interface to perform an additional search for data that is related to the voicemail message.

9. The memory as recited in claim 7, wherein identifying an index key associated with the voicemail message includes:

parsing contextual data included with the voicemail message; and determining whether multiple index keys are included in the contextual data.

10. The memory as recited in claim 7, wherein if multiple index keys are included in the contextual data, using the multiple index keys as search terms to identify data that is related to the voicemail message.

11. The memory as recited in claim 10, wherein performing a search for data that is related to the voicemail message includes assigning a relevance score to a search result; and wherein a search result is presented to the callee if the assigned relevance score is higher than a predetermined threshold value.

12. The memory as recited in claim 11, wherein the search results presented to the callee on the user interface includes data identified as a match to all of the multiple index keys.

13. The memory as recited in claim 7, wherein performing a search for data that is related to the voicemail message includes:

generating a query designed to identify data that matches an index key; and issuing the query to an information retrieval program.

14. The memory as recited in claim 7, wherein data that is identified as being related to the voicemail message includes word processing documents and e-mails.

15. The memory as recited in claim 7, wherein the user interface provides controls to initiate a call to a specified contact; and wherein the callee includes contextual data with the call by identifying the contextual data from the user interface.

16. The memory as recited in claim 7, wherein the user interface highlights data from a file identified as being the most relevant to a voicemail message.

17. A system implemented in a client communicatively connected to a digital voice communication environment that provides a callee with access to data related to a voicemail message, the system comprising:

a processor executing a routing, wherein the routine processes a voicemail message that comprises contextual data packets that carry information relating to data other than conversation data and conversational data packets that carry conversation data; wherein the processing accesses the contextual data packets within the voicemail message to identify contextual information in a voicemail message;

the processor executing an information retrieval program that identifies data comprising electronic messages and files that is related to a voicemail message in response to receiving a query and performing a search;

the processor executing a dashboard generation routine operative to provide a user interface that includes different display regions comprising: an index tree region that presents index key values used to identify data that is related to the voicemail message and provides an option to receive another index key that is used to search for related data to the voicemail message; a content tree region that displays a selectable list of the data determined to be related to the voicemail message; and a reading pane region that displays the selected data in different formats;

the processor executing a smart filtering subroutine operative to:

issue a query to the information retrieval program to identify data accessible from the client that is related to the voicemail message; and filter the results of the query for presentation on the user interface, and wherein using contextual information included with the voicemail message to identify data available from the client that is related to the voicemail message, includes:

extracting an index key from a file that stores the voicemail message;

wherein the index key is definable by the callee; and causing an information retrieval program to perform a search using the index key as a search term.

18. The system as recited in claim 17, wherein the smart filtering subroutine is further configured to:

obtain information related to a contact from a database; and cause the contact information to be presented on the user interface.

19. The system as recited in claim 17, wherein the dashboard generation routine is further configured to handle events accepted at the user interface, including events to:

cause a search to be performed using a callee-defined index key;

initiate a call to a specified contact; and transmit data over an existing communication channel.

* * * * *